United States Patent [19]
Sakuma

[11] Patent Number: 5,373,390
[45] Date of Patent: Dec. 13, 1994

[54] OPTICAL SCANNING SYSTEM
[75] Inventor: Nobuo Sakuma, Inagi, Japan
[73] Assignee: Ricoh Company, Ltd., Tokyo, Japan
[21] Appl. No.: 952,793
[22] Filed: Sep. 28, 1992

[30] Foreign Application Priority Data

Sep. 30, 1991 [JP] Japan ................... 3-252465
Dec. 19, 1991 [JP] Japan ................... 3-337146

[51] Int. Cl.$^5$ .............................................. G02B 26/08
[52] U.S. Cl. ..................... 359/208; 359/196; 359/219; 359/221
[58] Field of Search ............... 359/196, 205, 208, 212, 359/213, 216–219, 214, 221, 226, 868–869, 867; 346/108, 160; 250/234–236; 464/170; 358/474, 494, 497, 296

[56] References Cited

U.S. PATENT DOCUMENTS

| | | | |
|---|---|---|---|
| 5,062,003 | 10/1991 | Kawabata | 346/160 |
| 5,157,534 | 10/1992 | Wada et al. | 359/212 |
| 5,170,278 | 12/1992 | Endou et al. | 359/212 |
| 5,227,811 | 7/1993 | Kohsaka | 359/216 |
| 5,233,454 | 8/1993 | Sakuma et al. | 359/196 |

FOREIGN PATENT DOCUMENTS 63-4172 2/1988 Japan .
64-72118 3/1989 Japan .

OTHER PUBLICATIONS

Technique of Optoelectronics '92, Jan. 30, 1992, N. Sakuma, "An Optical Scanning Element and an Optical System", 33 pages.

Primary Examiner—Loha Ben
Assistant Examiner—James Phan
Attorney, Agent, or Firm—Oblon, Spivak, McClelland, Maier & Neustadt

[57] ABSTRACT

The present invention relates to an optical scanning system for deflecting a light beam from a light source by a rotating deflector, reflecting the deflected light beam onto an fθ mirror having fθ characteristics, and focussing the reflected light beam as a light spot on a scanned surface to thereby carry out optical writing and optical scanning. The fθ mirror is unitedly formed with an optical housing.

9 Claims, 7 Drawing Sheets

OPTICAL SCANNING SYSTEM

BACKGROUND OF THE INVENTION

1. Field of the Invention

The present invention relates to an optical scanning system which is used for a writing optical system such as a laser printer, a laser facsimile, a digital copying machine, etc. and is used for an optical scanning system of a measuring apparatus such as a laser face flaw detector or the like. More particularly, the present invention relates to an optical scanning system using an fθ mirror.

2. Description of the Related Art

Conventionally, an optical scanning system has been known in which a light beam emitted from a light source such as a laser light source is deflected at an equal angular velocity by a deflector, and the deflected light beam is focused on a scanned face as a light spot through an fθ lens or the like so as to carry out an optical writing and an optical scanning. This optical scanning system has been used for a writing optical system such as a laser printer, a laser facsimile, a digital copying machine, etc. and for a measuring apparatus such as a laser face flaw detector or the like.

In such an optical scanning system, for the purpose of making a device compact, reducing the number of components, developing an assembling accuracy, improving an optical performance, and so forth, there has been proposed an optical scanning system characterized in that a base supporting a light source portion, a base supporting a bearing of a deflector and a base supporting an image forming lens of the optical scanning system are unitedly molded (Japanese Utility Model Publication No. 63-4172).

In the optical scanning system disclosed in the above-mentioned Publication, the base supporting the light source portion, the base supporting the bearing of the deflector and the base supporting the image forming lens are unitedly molded. That is to say, the optical scanning system disclosed in the Publication includes "a supporting portion", and the light source portion, the bearing portion, and the image forming portion are fixed onto "the supporting portion" as separate components from an optical housing (an optical box) of the optical scanning system.

Especially, an fθ lens is used for the image forming portion in the embodiment of the Publication. In this case, the fθ lens is made of a transparent material, and it is not considered that the fθ lens is unitedly molded with the optical housing. In contrast, it is possible to consider that the optical housing including the fθ lens is unitedly molded by using the transparent material. However, this case necessitates the drawing of a mold in a direction vertical to a surface of the fθ lens (an optical axis of the lens), and it is therefore practically difficult to mold the fθ lens unitedly with the housing.

SUMMARY OF THE INVENTION

It is therefore an object of the present invention to provide an optical scanning system which enables the uniting of an optical system portion with a housing to miniaturize a device, reduce the number of its components, and further improve an accuracy and a reliability of the device, etc.

According to the present invention, the above-mentioned object can be achieved by an optical scanning system for deflecting a light beam from a light source at an equal angular velocity by a deflector, reflecting the deflected light beam on a mirror having fθ characteristics (referred to hereinafter as an fθ mirror), and focussing the reflected light beam as a light spot on a scanned face thereby to carry out an optical writing and an optical scanning, wherein the fθ mirror is formed unitedly with an optical housing.

In the optical scanning system of the present invention, the fθ mirror is used for the image forming portion, whereby the image forming portion can be formed unitedly with the optical housing by a resin molding or the like. Further, a mold can be drawn during the resin molding in a preferable direction in comparison with the fθ lens.

Therefore, since the image forming portion of the optical scanning system is constructed by the fθ mirror, which is molded unitedly with the optical housing, in the present invention, it becomes possible to make the device more compact and to reduce the number of components. Further, an attaching member for the fθ mirror and attaching work therefore become unnecessary. Furthermore, a performance decrement resulting from dispersions in fixing the fθ mirror can be avoided and a reliability of the device can be improved.

Further objects and advantages of the present invention will be apparent from the following description of the preferred embodiments of the invention as illustrated in the accompanying drawings.

BRIEF DESCRIPTION OF THE DRAWINGS

FIG. 1b is a side schematic view showing an optical system of FIG. 1a;

DESCRIPTION OF THE PREFERRED EMBODIMENTS

The embodiments of an optical scanning system will be described below with reference to the accompanying drawings.

Figure 1A:
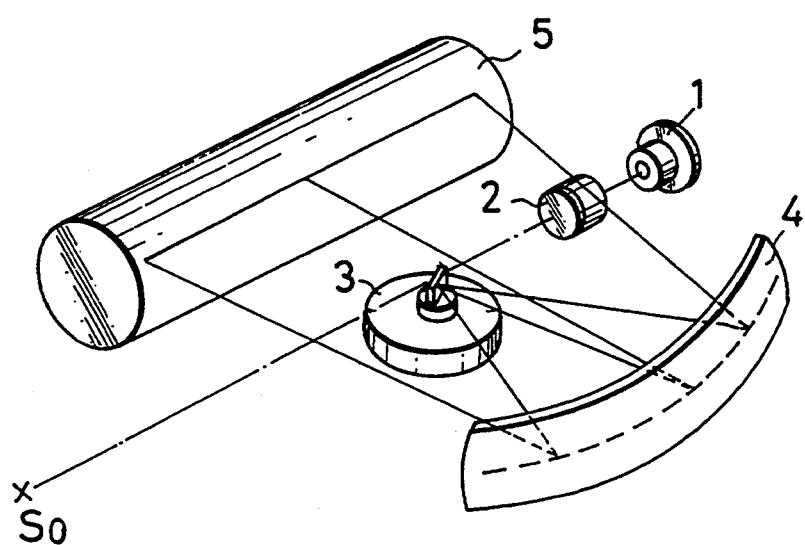
FIG. 1a is a schematic view showing one embodiment of an optical scanning system using an fθ mirror.
Figure 1B:
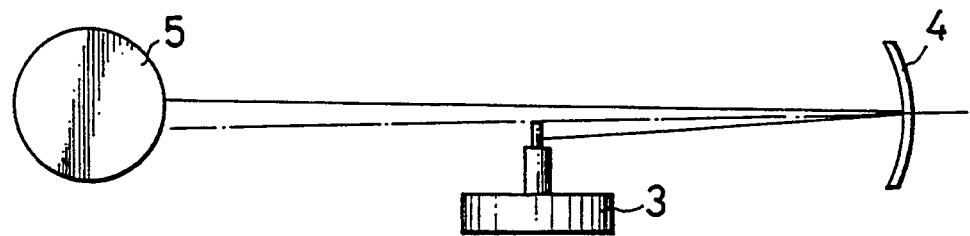

FIG. 1a is a schematic view showing one embodiment of a construction of an optical scanning system of the present invention using an fθ mirror, and FIG. 1b is a side schematic view showing the optical system of FIG. 1a.

In FIGS. 1a and 1b, reference numeral 1 denotes a light source, 2 denotes a coupling lens, and 3 denotes a deflector having a mirror fixed unitedly with a shaft of a motor. For the light source 1, a semi-conductor laser (LD), a light emitting diode (LED), or the like is used. Convergent light from the light source 1 is deflected at an equal angular velocity by a rotating mirror. In the figures, the mirror of the deflector 3 is a rotary mirror. For the rotary mirror, a polygon mirror, a pyramidal mirror, a tenon-shaped mirror, or the like which is publicly known can be appropriately used.

Figure 2:
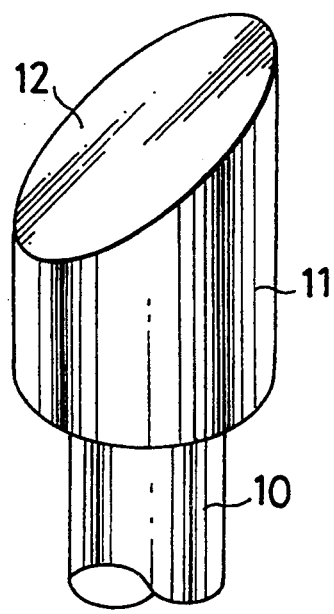
FIG. 2 is a perspective view showing one embodiment of a pyramidal mirror.

A pyramidal mirror is shown in FIG. 2. A cap-like pyramidal mirror 11 is fixed on a leading end of the rotary shaft 10. The pyramidal mirror 11 has a shape of a diagonally cut cylindrical body. A cut inclined face 12 forms a reflective face.

Figure 3A:
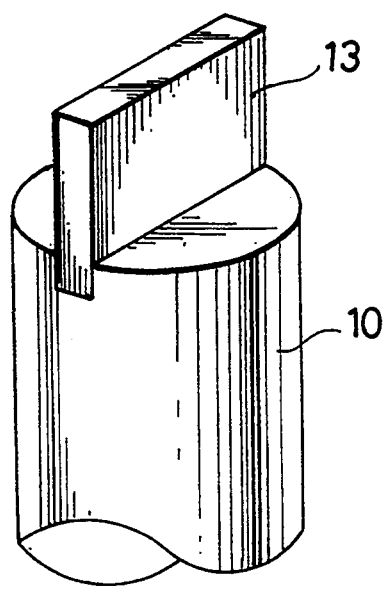
FIG. 3a is a perspective view of one embodiment of a tenon-shaped mirror.
Figure 3B:
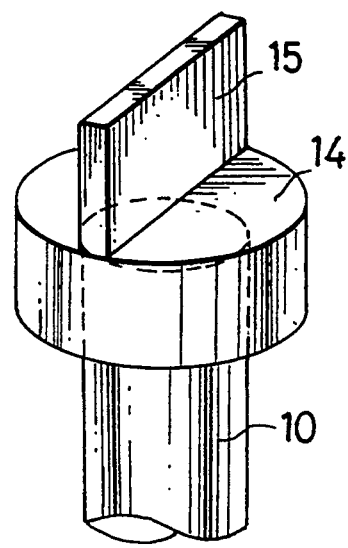
FIG. 3b is a perspective view of another embodiment of a tenon-shaped mirror.

A tenon-shaped mirror is shown in FIGS. 3a and 3b. A plate mirror 13 is inserted into the leading end of the rotary shaft 10 (FIG. 3a). Also, a cap-like tenon-shaped mirror 14 in FIG. 3b is provided on tile leading end of the rotary shaft 10 with the mirror 14 having a plate mirror 15 mounted thereon.

In FIGS. 1a and 1b, reference numeral 4 denotes an $f\theta$ mirror having $f\theta$ characteristics, and 5 is a scanned face of a photoreceptor or the like.

An embodiment of the $f\theta$ mirror 4 is described below.

An $f\theta$ lens may be used as the image forming portion of an optical scanning system. However, an $f\theta$ mirror has been recently used instead of $f\theta$ lens in the image forming optical systems.

However, when a light beam incident on a concave mirror is converted into a parallel light beam, the length of an optical path from the concave mirror to the scanned face of a photoreceptor is increased so that it is difficult to make an optical scanner compact.

It is therefore considered that the light beam incident to the $f\theta$ mirror used instead of the $f\theta$ lens is made to be convergent so as to reduce the length of the optical path from the $f\theta$ mirror to the scanned face of a photoreceptor and make the optical scanner compact.

When a face of the $f\theta$ mirror used instead of the $f\theta$ lens is formed by a general spherical surface or a normal quadratic surface, it is possible to preferably correct field curvature. However, it is very difficult to preferably correct the linearity of an image.

The $f\theta$ lens can be constructed by an image forming reflecting mirror for an equal speed optical scan in which a convergent light beam is deflected at an equal angular velocity and is further converged to form a light spot on a scanned face of a photoreceptor so as to optically scan said scanned face at an equal speed; the image forming reflecting mirror comprising an aspherical concave reflecting face of a hyperboloidal type having a function for correcting field curvature and linearity; the aspherical concave reflecting face having a conical constant K satisfying $K < -1$ and an aspherical coefficient $A_4$ of a fourth order satisfying $A_4 \neq 0$.

The $f\theta$ mirror can be also constructed by an optical scanner comprising a light source; a condenser lens for converging a light beam emitted from the light source; a light deflector for deflecting a convergent light beam from the condenser lens at an equal angular velocity; a concave mirror for reflecting a deflected light beam from the light deflector to form a light spot on a scanned face of a photoreceptor; and light beam splitting means for separating a light beam reflected from the concave mirror from an incident optical path from the light source to the concave mirror; the concave mirror being constructed by an image forming reflecting mirror for an equal speed optical scan.

The $f\theta$ mirror can be also constructed by an image forming reflecting mirror for an equal speed optical scan in which a light beam is convergent in a main scan-corresponding direction and is divergent in a cross scan-corresponding direction with a point near a point of deflection serving as a starting point of the light beam, and the light beam is deflected at an equal angular velocity and is converged to form a light spot on a scanned face of a photoreceptor so as to optically scan the scanned face at an equal speed. The image forming reflecting mirror has a shape on a deflecting-reflecting face represented by the following general formula:

$$X = Y^2/\{R_m + \sqrt{[R_m^2 - (1+K)Y^2]}\} + A_2 Y^2 + A_3 Y^3 + A_4 Y^4 + \ldots$$

In this formula, X designates a coordinate in the direction of an optical axis and Y designates a coordinate in a direction perpendicular to the optical axis with a position on the optical axis as an origin, $R_m$ designates a radius of curvature on the optical axis, K a conical constant, $A_2$, $A_3$, $A_4$ designate aspherical coefficients, and symbol $\sqrt{[]}$ designates a square root of a value within brackets. The image forming reflecting mirror has a concave aspherical toroidal mirror face in the cross scan-corresponding direction which is separated by a distance $R_s$ from a mirror face on the optical axis and is formed by rotating the above shape about an axis perpendicular to the optical axis on the deflecting-reflecting face as a rotational axis. A distance S on a deflecting scanning face between a natural convergent point of the deflected light beam in the main scan-corresponding direction and the starting point of deflection, and the values $R_m$, K and $A_4$ satisfy the following conditions:

$$-1.7 \cdot 10^5 < S \cdot R_m < -0.7 \cdot 10^5$$

$$-8.0/10^9 < A_4/K < 8.0/10^9$$

$$-0.4 < R_s/S < -0.3$$

The $f\theta$ mirror can be also constructed by an optical scanner comprising a light source; a condenser lens for converging a light beam emitted from the light source; a linear image forming lens for focusing and forming a convergent light beam from the condenser lens as a linear image extending in a main scan-corresponding direction; a light deflector having a deflecting-reflecting face in the vicinity of a forming position of the linear image for deflecting a light beam from a side of the linear image forming lens at an equal angular velocity; a concave mirror for reflecting a deflected light beam from the light deflector to form a light spot on a scanned face of a photoreceptor; and light beam splitting means for separating a light beam reflected on the concave mirror from an incident optical path from the light source to the concave mirror; the concave mirror being constructed by an image forming reflecting mirror for an equal speed optical scan.

The $f\theta$ mirror can be also constructed by an image forming reflecting mirror for an equal speed optical scan in which a light beam is convergent in a main scan-corresponding direction and is divergent in a cross scan-corresponding direction with a point near a point of deflection serving as a starting point of the light beam, and the light beam is deflected at an equal angular velocity and is converged to form a light spot on a scanned face of a photoreceptor so as to optically scan the scanned face at an equal speed. The image forming reflecting mirror has a shape on a deflecting-reflecting face represented by the following general formula:

$$Y^2 = 2R_m X - (K+1)X^2$$

In this formula, X designates a coordinate in the direction of an optical axis and Y designates a coordinate in a direction perpendicular to the optical axis with a position on the optical axis as an origin, $R_m$ designates a radius of curvature on the optical axis and K designates a conical constant. The image forming reflecting mirror has a concave mirror face of a barrel or saddle type in the cross scan-corresponding direction which is separated by a distance $R_s$ from a mirror face on the optical axis and is formed by rotating the above shape about an axis perpendicular to the optical axis on the deflecting-reflecting face as a rotational axis. A new conical constant $E = K+1$ satisfies the following condition.

$$-2 \leq E \leq 15$$

In accordance with the above-mentioned fθ mirror, field curvature and the linearity of an image are preferably corrected by using an aspherical face in the image forming reflecting mirror for an equal speed optical scan and in the optical scanner using this image forming reflecting mirror. Further, a so-called deflecting face inclination of a deflecting means can be corrected.

In FIGS. 1a and 1b, a light emitted from the light source 1 becomes a convergent light beam through a coupling lens 2. The convergent light beam advantaces convergently toward a first focal point S₀, impinges on a deflecting mirror of the deflector 3 and is deflected toward the fθ mirror 4. The fθ mirror 4 realizes a constant speed plane scanning on a scanned face 5 of a photoreceptor, by further converging the convergent light which has been deflected at an equal angular velocity by the deflector 3.

When the fθ mirror 4 is anamorphic, it is also possible to construct an optical system for correcting a deflecting face inclination by inserting between the coupling lens 2 and the deflector 3 a cylindrical lens (not shown) having a power in a sub-scanning direction, while converging the light beam toward the vicinity of the deflecting point. In this case, it is possible that not only a convergent light beam but also a parallel or a divergent light beam is most suitable as the light beam from the coupling lens 2.

Figure 4:
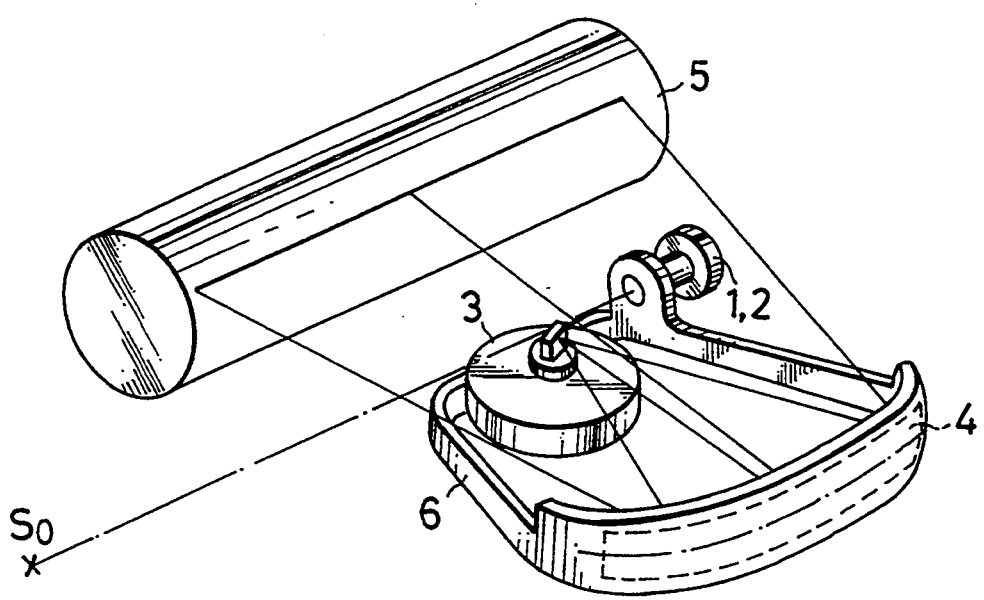
FIG. 4 is a schematic view showing one embodiment of the optical scanning system of the present invention.

FIG. 4 is a schematic view showing one embodiment of the present invention. In FIG. 4, the fθ mirror 4, the light source 1, a supporting portion of the coupling lens 2 and a supporting portion of the deflector 3 (a supporting portion of the bearing or a supporting portion of the motor body, etc.) are formed unitedly with an optical housing 6.

Also in this case, as explained in FIGS. 1a and 2b, the cylindrical lens (not shown) can be disposed between the coupling lens 2 and the deflector 3 or unitedly with a coupling lens 2, and the cylindrical lens can be fixed unitedly with the optical housing 6.

The portion of the fθ mirror 4 can be formed simultaneously during formation of the optical housing 6 by a resin molding or the like. In the case of the resin molding, the fθ mirror 4 can be easily obtained by producing a mirror face with a thin film of aluminum or silver by a method of a vapor-deposition, a sputtering, a coating, etc. after the mold has been drawn.

FIGS. 5a, 5b, 6a, 6b, 7a, 7b, 8a and 8b are views explaining more concrete embodiments of the present invention. The fθ mirror 4, the supporting portion of the light source 1 and the coupling lens 2, and the supporting portion of the deflector 3 (the supporting portion of the bearing or the supporting portion of the motor body, etc.) are formed unitedly with the optical housing 6.

In FIGS. 5a, 5b, 6a, 6b, 7a, 7b, 8a and 8b reference numeral 7 denotes a mirror for deflecting an optical path.

Figure 6A:
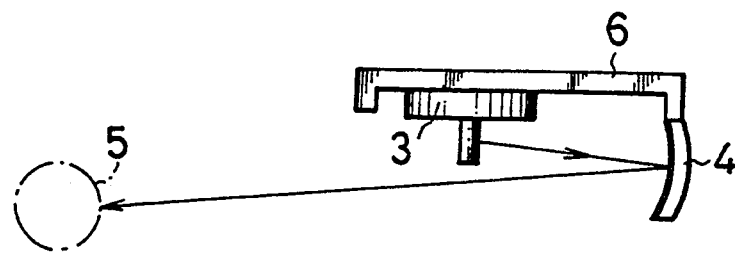
FIG. 6a and FIG. 6b are a side view and a plan view respectively, showing still another embodiment of the optical scanning system of the present invention.
Figure 6B:
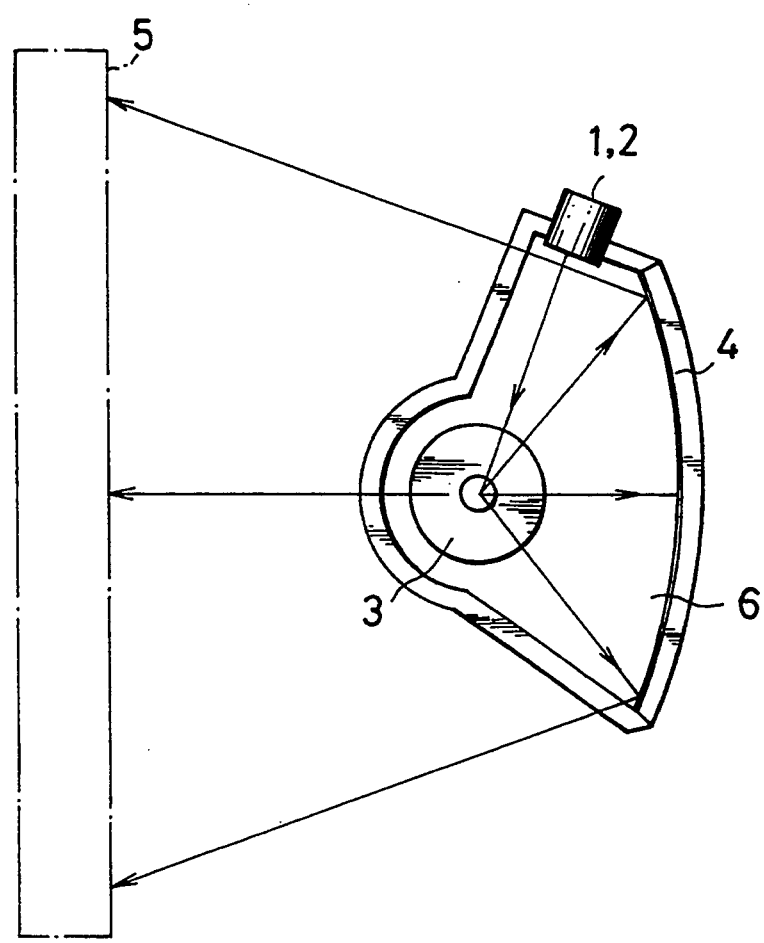
Figure 7A:
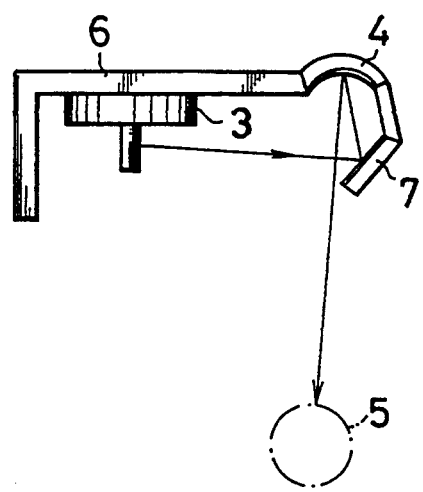
FIG. 7a and FIG. 7b are a side view and a plan view respectively, showing a further embodiment of the optical scanning system of the present invention.
Figure 7B:
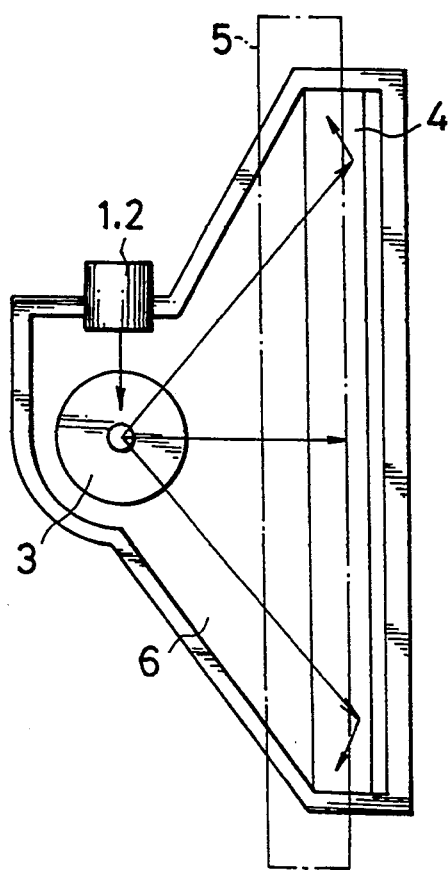
Figure 8A:
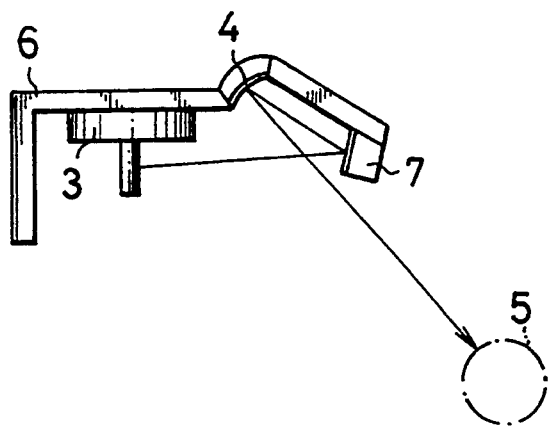
FIG. 8a and FIG. 8b are a side view and a plan view respectively, showing a still further embodiment of the optical scanning system of the present invention.
Figure 8B:
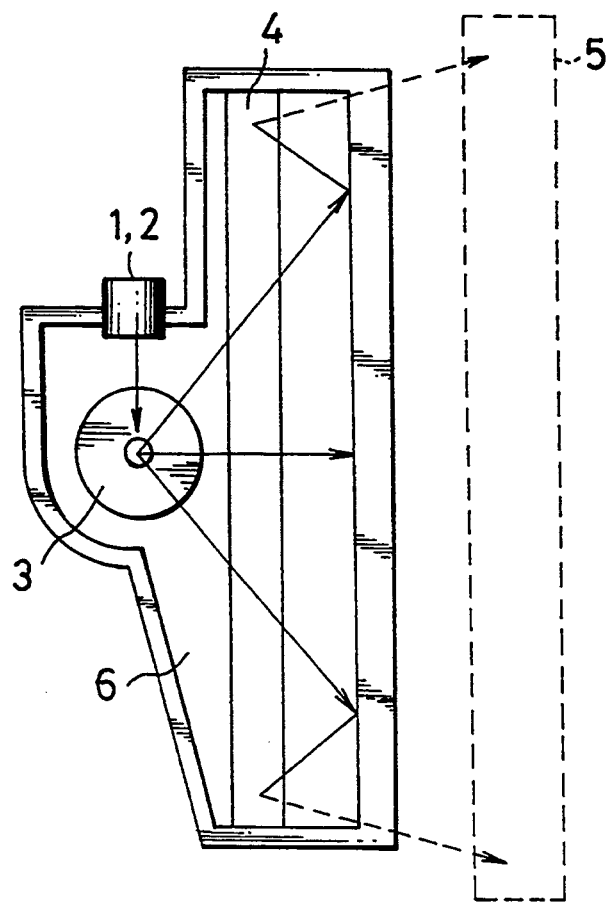

FIGS. 6a and 6b show an embodiment of an optical scanning system not using the deflecting mirror 7, and corresponds to the embodiment of FIG. 4, in which the fθ mirror 4 is formed on a side face of the optical housing 6.

Figure 5A:
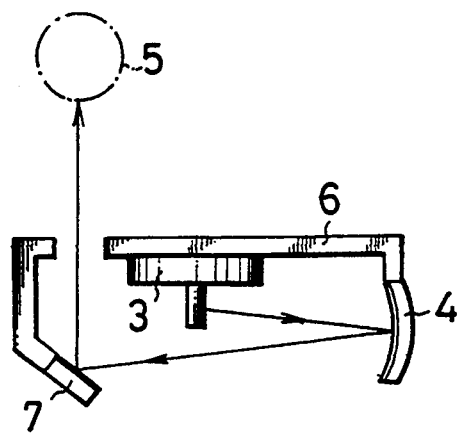
FIG. 5a and FIG. 5b are a side view and a plan view respectively, showing another embodiment of the optical scanning system of the present invention.
Figure 5B:
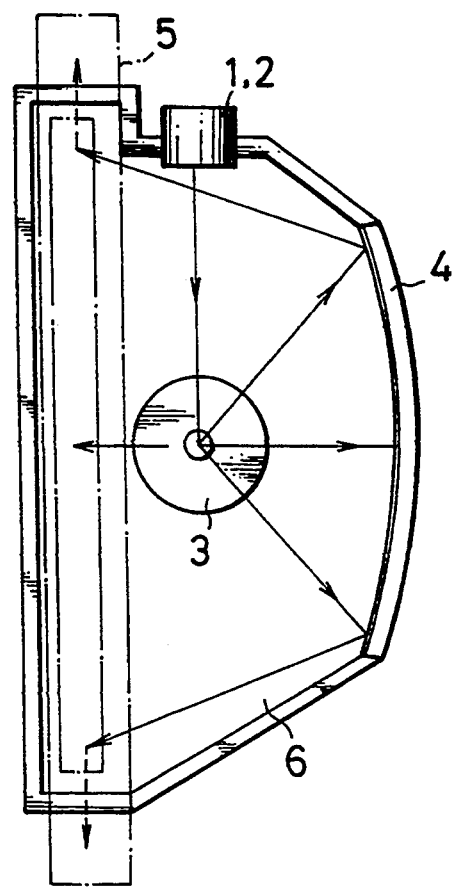

In the embodiment of FIGS. 5a and 5b, the fθ mirror 4 is formed onto the side face of an optical housing 6. The deflecting mirror 7 is united with the optical housing 6. In this case, although a scanned face 5 of a photoreceptor or the like is optionally positioned with respect to the housing 6, depending on an angle of the deflecting mirror 7, the optical housing 6 is slightly larger in size than that shown in FIG. 4.

FIGS. 7a-7b and 8a-8b show the constructions of embodiments in which the deflector 3 is placed apart from the fθ mirror 4 at a large distance. In these embodiments, the light beam emitted from the light source 1 becomes convergent through the coupling lens 2, and is deflected at an equal angular velocity by the deflector 3, after which an optical path of the deflected light beam is deflected by the deflecting mirror 7, and then the deflected light is reflected off of the fθ mirror 4 so as to be focused on the scanned face 5 of a photoreceptor.

In the embodiments of FIGS. 7a-7b and 8a-8b, the fθ mirror 4 is formed on the upper face of the optical housing 6. If these embodiments are turned upside down, they become examples in which the fθ mirror 4 is formed on the bottom of the optical housing 6.

When the fθ mirror 4 is unitedly formed on the upper face or on the bottom of the optical housing 6 as in FIGS. 7a-7b to 8a-8b, it is possible to easily create the mold and to produce an accurate and precise mirror face. Especially, when the fθ mirror is formed on the upper face, fine powder such as dust and toner or the like is hardly present on the fθ mirror, thereby effecting an advantage of preventing a decrease of the reflective capability of the mirror.

The deflector 3 may be placed on the bottom of the housing 6 as in FIG. 4, or may be placed on the upper face of the housing 6 as shown in FIGS. 5a, 5b, 6a, 6b, 7a, 7b, 8a and 8b. Further, tile deflector 3 may be placed on the side face of the housing 6 in such a manner that the rotary shaft of the motor is positioned transversely.

In the optical scanning system of the present invention, as shown in the embodiments of FIGS. 5a, 5b, 6a, 6b, 7a, 7b, 8a and 8b, the scanned face 5 of the photoreceptor or the like is freely positioned by uniting with the optical housing 6 the constructive members such as the light source 1, the coupling lens 2, the deflector 3, and the fθ mirror 4, etc.

Since the supporting portion of the light source or the supporting portion of the deflector is unitedly formed with the optical housing, this increased degree of integration allows the device to be more compact and the number of components to be reduced. When the light source, the deflector, and the f$\theta$ mirror are fixed unitedly with the optical housing, the positional relation therebetween is unchangeable, and an adjustment, after the fixation of these components becomes completely unnecessary. In addition, the layout of the scanned face of the photoreceptor with respect to the housing can be freely determined, whereby the miniaturization of devices such as a laser printer, a laser facsimile, a digital copier, etc. can be further developed.

In the case where the f$\theta$ mirror and the optical housing are made of the same material, the f$\theta$ mirror and the optical housing body can be formed simultaneously by one molding such as a resin molding or the like, so that reduction of product cost, miniaturization of the device, and high reliability on the device can be easily obtained. These merits result from using the f$\theta$ mirror for a optical scanning system. In the case where the conventional transmission type optical system as the f$\theta$ lens is used, it is difficult to mold the f$\theta$ lens unitedly with the housing by using the same material as that of the optical housing, therefore the realization of the integration by molding is difficult.

In the embodiments of FIGS. 4, 5a, 5b, 6a, 6b, 7a, 7b, 8a and 8b, the light beam from the light source, is not limited to a convergent light beam but also may be a parallel or divergent light beam in accordance with the characteristics of the f$\theta$ mirror.

Many widely different embodiments of the present invention may be constructed without departing from the spirit and scope of the present invention. It should be understood that the present invention is not limited to the specific embodiments descried in the specification, except as defined in the appended claims.

What is claimed is:

1. An optical scanning system for performing optical writing and optical scanning, comprising:
   an optical housing;
   rotating deflector means disposed on said optical housing and rotating at an angular velocity, for deflecting light emitted from a light source; and
   an f$\theta$ mirror having f$\theta$ characteristics, said f$\theta$ mirror being formed unitedly with said optical housing during manufacture and receiving said light deflected by said rotating deflector means and focussing said light as a light spot on a scanned surface.

2. An optical scanning system according to claim 1, wherein said f$\theta$ mirror is disposed on an upper face of said optical housing.

3. An optical scanning system according to claim 1, wherein said f$\theta$ mirror is disposed on a bottom of said optical housing.

4. An optical scanning system according to claim 1, wherein said f$\theta$ mirror is disposed on a side face of said optical housing.

5. An optical scanning system according to claim 1, wherein a supporting portion of said light source is formed unitedly with said optical housing during manufacture.

6. An optical scanning system according to claim 1, wherein a supporting portion of said rotating deflector means is formed unitedly with said optical housing during manufacture.

7. An optical scanning system according to claim 1, wherein a supporting portion of said light source and a supporting portion of said rotating deflector means are formed unitedly with said optical housing during manufacture.

8. An optical scanning system according to claim 1, wherein said f$\theta$ mirror and said optical housing are formed of an identical material.

9. An optical scanning system for performing optical writing and optical scanning, comprising:
   an optical housing;
   rotating deflector means disposed on said optical housing and rotating at an angular velocity, for deflecting light emitted from a light source; and
   an f$\theta$ mirror having f$\theta$ characteristics, said f$\theta$ mirror being formed unitedly with said optical housing during manufacture and receiving said light deflected by said rotating deflector means and focussing said light as a light spot on a scanned surface, wherein said f$\theta$ mirror and said optical housing are formed of an identical material.

* * * * *